US006937289B1

(12) United States Patent
Ranta et al.

(10) Patent No.: US 6,937,289 B1
(45) Date of Patent: Aug. 30, 2005

(54) METHOD AND SYSTEM FOR DOWNLOADING AND STORING INTERACTIVE DEVICE CONTENT USING THE HORIZONTAL OVERSCAN PORTION OF A VIDEO SIGNAL

(75) Inventors: Craig S. Ranta, Redmond, WA (US); Jeffrey M. Alexander, North Bend, WA (US); Harjit Singh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/475,832

(22) Filed: Dec. 30, 1999

(51) Int. Cl.⁷ .......................... H04N 7/00; H04N 7/08
(52) U.S. Cl. ..................... 348/460; 348/466; 348/473; 348/479; 348/558
(58) Field of Search ............................. 348/460, 473, 348/474, 476, 477, 478, 479

(56) References Cited

U.S. PATENT DOCUMENTS

| | | | |
|---|---|---|---|
| 3,493,674 A | 2/1970 | Houghton | 178/5.6 |
| 3,743,767 A | 7/1973 | Bitzer et al. | 178/5.6 |
| 3,891,792 A | 6/1975 | Kimura | 178/5.8 |

(Continued)

FOREIGN PATENT DOCUMENTS

| | | | | |
|---|---|---|---|---|
| EP | 0710022 A2 | 10/1995 | | |
| WO | WO 91 10490 | 7/1991 | | |
| WO | WO 92/19073 | 10/1992 | | H04N 7/08 |
| WO | WO 93/18614 | 9/1993 | | H04N 7/00 |
| WO | WO 93/23955 | 11/1993 | | H04N 7/08 |
| WO | WO 94/24820 | 10/1994 | | H04N 7/087 |
| WO | WO 99 00979 A | 1/1999 | | |
| WO | WO 00 44460 A | 8/2000 | | |

OTHER PUBLICATIONS

U.S. Appl. No. 09/476,291, filed Dec. 30, 1999.

*Primary Examiner*—John Miller
*Assistant Examiner*—Trang U. Tran
(74) *Attorney, Agent, or Firm*—Ronald M. Anderson

(57) ABSTRACT

A method and system for decoding and storing encoded control data delivered via the horizontal overscan area of a video signal. An interactive device such as an interactive toy performs behavior defined by control data that can be encoded into a video signal that can be broadcast or played-back from video tape. The interactive device is equipped with a non-volatile memory that permits the control data to be stored for performance subsequent to the transmission session (e.g., a televised program). The interactive device also may be equipped to perform behavior during the transmission session. The control data is delivered as a series of control data words that include genus codes and sequence codes. Genus codes identify the interactive device to which the data word is directed, so that a particular interactive device will respond (i.e., perform behavior) only in accordance with the control data words including the appropriate genus code. Because video transmissions are subject to video signal deterioration, error grading is used to minimize the effect of such signal deterioration. During a given control data transmission session, control data words will be repeated, so that an interactive device receives several control data words with the same sequence number. Based on the relative gradings, the interactive device will replace previously received control data words of lower quality than subsequently received data words having the same sequence number.

21 Claims, 5 Drawing Sheets

U.S. PATENT DOCUMENTS

| | | | |
|---|---|---|---|
| 3,900,887 A | 8/1975 | Soga et al. | 360/18 |
| 3,993,861 A | 11/1976 | Baer | 178/5.6 |
| 4,186,413 A | 1/1980 | Mortimer | 358/146 |
| 4,207,704 A | 6/1980 | Akiyama | 46/232 |
| 4,368,486 A | 1/1983 | Degoulet et al. | 358/146 |
| 4,540,176 A | 9/1985 | Baer | 273/148 |
| 4,599,644 A | 7/1986 | Fischer | 358/84 |
| 4,638,359 A | 1/1987 | Watson | 358/147 |
| 4,660,033 A | 4/1987 | Brandt | 340/825 |
| 4,665,431 A | 5/1987 | Cooper | 358/145 |
| 4,729,563 A | 3/1988 | Yokoi | 273/1 |
| 4,771,344 A | 9/1988 | Fallacaro et al. | 358/335 |
| 4,807,031 A | 2/1989 | Broughton et al. | 358/142 |
| 4,840,602 A | 6/1989 | Rose | 446/175 |
| 4,846,693 A | 7/1989 | Baer | 434/308 |
| 4,847,699 A | 7/1989 | Freeman | 358/343 |
| 4,847,700 A | 7/1989 | Freeman | 358/343 |
| 4,855,827 A | 8/1989 | Best | 358/143 |
| 4,862,268 A | 8/1989 | Campell et al. | 358/141 |
| 4,864,607 A | 9/1989 | Mitamura et al. | 379/388 |
| 4,930,019 A | 5/1990 | Chu | 358/335 |
| 4,949,327 A | 8/1990 | Forsse et al. | 369/58 |
| 4,969,041 A | 11/1990 | O'Grady et al. | 358/142 |
| 5,021,878 A | 6/1991 | Lang | 358/93 |
| 5,108,341 A | 4/1992 | DeSmet | 446/299 |
| 5,198,893 A | 3/1993 | Lang | 358/93 |
| 5,200,822 A * | 4/1993 | Bronfin et al. | 348/473 |
| 5,243,423 A | 9/1993 | DeJean | 358/142 |
| 5,255,097 A | 10/1993 | Spiero et al. | 358/181 |
| 5,270,480 A | 12/1993 | Hikawa | 84/645 |
| 5,371,545 A | 12/1994 | Tults | 348/465 |
| 5,398,071 A | 3/1995 | Gove et al. | 348/558 |
| 5,402,419 A | 3/1995 | Osakabe et al. | 370/85.1 |
| 5,450,134 A | 9/1995 | Legate | 348/467 |
| 5,453,794 A | 9/1995 | Ezaki | 348/461 |
| 5,453,795 A | 9/1995 | Tults | 348/465 |
| 5,463,423 A | 10/1995 | Tults | 348/465 |
| 5,483,289 A | 1/1996 | Urade et al. | 348/468 |
| 5,561,469 A | 10/1996 | Schultz | 348/476 |
| 5,629,738 A | 5/1997 | Kim | 348/465 |
| 5,655,945 A | 8/1997 | Jani | 446/175 |
| 5,703,658 A | 12/1997 | Tsuru et al. | 348/554 |
| 5,752,880 A | 5/1998 | Gabai et al. | 463/1 |
| 5,808,689 A | 9/1998 | Small | 348/476 |
| 5,812,207 A | 9/1998 | Cahill, III | 348/465 |
| 5,873,765 A * | 2/1999 | Rifkin et al. | 446/301 |
| 5,977,951 A | 11/1999 | Danieli et al. | 345/156 |
| 6,005,632 A | 12/1999 | Cahill, III | 348/465 |
| 6,012,961 A * | 1/2000 | Sharpe et al. | 446/298 |
| 6,040,870 A * | 3/2000 | Small | 348/476 |
| 6,057,889 A | 5/2000 | Reitmeier et al. | 348/555 |
| 6,072,532 A | 6/2000 | Chieh et al. | 348/478 |
| 6,229,572 B1 | 5/2001 | Ciardullo et al. | 348/473 |
| 6,281,939 B1 | 8/2001 | Del Castillo et al. | 348/558 |
| 6,377,308 B1 | 4/2002 | Cahill, III | 348/461 |
| 6,415,439 B1 | 7/2002 | Randell et al. | 725/153 |
| 6,556,247 B1 * | 4/2003 | Ranta et al. | 348/476 |

* cited by examiner

METHOD AND SYSTEM FOR DOWNLOADING AND STORING INTERACTIVE DEVICE CONTENT USING THE HORIZONTAL OVERSCAN PORTION OF A VIDEO SIGNAL

TECHNICAL FIELD

The present invention relates to data communication systems and, more particularly, relates to encoding interactive device data in the horizontal overscan portion of a video signal and storing the data within an interactive device.

BACKGROUND OF THE INVENTION

Interactive devices have become very popular with consumers. One example of an interactive device is an interactive toy, which is a toy that responds to input from an external data source, such as a user or a video signal. Interactive toys are commonly implemented in the form of a child's doll, such as a teddy bear. An interactive toy will usually be capable of speech and/or motion, collectively referred to as interactive toy behavior. One example of an interactive toy responds to sound impulses, such as the speech of a user other noises in a room. Another kind of interactive toy responds to data that is delivered by a data stream, such as data delivered via a video signal or over an Internet connection.

Transmitting behavior data via a video signal provides the advantage of enabling the coordination of a video program with a particular interactive device. For example, behavior data can be transmitted to a teddy bear interactive toy during a television program about the same teddy bear. Thus, the behavior of the teddy bear interactive toy can be coordinated with events occurring in the televised program. For example, the teddy bear interactive toy might sing and dance in concert with characters in the televised program.

Providing interactive data to an interactive toy via a video signal has been implemented in various ways. In an early implementation of such an interactive toy, behavior data was transmitted to the interactive toy in a portion of a video signal that was not viewable by the user watching the program. The interactive toy received the data by monitoring the video signal and extracting the behavior data from the non-viewable portion. Unfortunately, in this implementation the behavior data was transmitted in a portion of the signal that was not reproduced when the video transmission was stored on video tape. Thus, the behavior data could only be transmitted via a television broadcast and could not be transmitted via a video taped program. This deficiency limited the market for such interactive toys, as it is desirable to provide behavior data on video tapes that can be sold in conjunction with the interactive toy.

Another approach to transmitting behavior data via a video signal varied the brightness of portions of a video image. This approach provided the benefit of being reproducible on video tape, as the behavior data was transmitted as part of the viewable video signal. The brightness variations were associated with predetermined behavior data. When the interactive toy was placed directly in front of the television screen displaying the video image, a decoder on the interactive toy would translate the brightness variations into behavior data. While this approach permitted the behavior data to be stored on video tape, the approach had other shortcomings. Most notably, the image which refreshes only 60 times per second, makes this approach unsuitable for most applications requiring significant data throughput rates.

One of the more recent implementations of behavior data transmission technology uses the horizontal overscan portion of a video signal to transmit data to an interactive toy. Advantageously, the horizontal overscan portion of the video signal is reproducible on video tape. The achievable data transmission rate is limited by the much faster horizontal refresh rate of the video. The video signal can be decoded either by a separate decoder unit or by the toy itself to extract the behavior data. Once the data has been decoded, the data can be used to cause the toy to perform various speech or actions. Usually, this technology is implemented by transmitting the interactive toy content data during a television show or throughout a program recorded on a video tape.

Unfortunately, interactive toys existing in the prior art were unable to retain the ability to perform the actions defined by the extracted data. That is, once the data transmission was ceased (i.e., the television show or video taped program ended), then the toy lost its ability to perform the actions defined by the interactive toy content data. This problem exists for two reasons: 1) prior art interactive toys do not include a programmable non-volatile memory; and 2) prior art video data encoding systems did not provide enough bandwidth to transfer enough data to support such behavior retention.

Therefore, there is a need for a system capable of delivering interactive toy content data to an interactive toy at a high data throughput rate and for enabling the toy to retain the behavior defined in the interactive toy content data. The system should be able to be deployed over any means of delivering a video signal, such as via television antenna, cable television, or video tape. The system should be robust, such that the effects of data transmission errors can be minimized.

SUMMARY OF THE INVENTION

The present invention meets the needs described above by providing a method and system for decoding and storing control data transmitted in the horizontal overscan portion of a video signal. An interactive device such as an interactive toy performs behavior defined by control data that can be encoded into a video signal that can be broadcast or played-back from video tape. The interactive device is equipped with a non-volatile memory that permits the control data to be stored for performance subsequent to the transmission session (e.g., a televised program). The interactive device also may be equipped to perform behavior during the transmission session. The control data is delivered as a series of control data words that include genus codes and sequence codes. Genus codes identify the interactive device to which the data word is directed, so that a particular interactive device will respond (i.e., perform behavior) only in accordance with the control data words including the appropriate genus code. Because video transmissions are subject to video signal deterioration, error grading is used to minimize the effect of such signal deterioration. During a given control data transmission session, control data words will be repeated, so that an interactive device receives several control data words with the same sequence number. Based on the relative gradings, the interactive device will replace previously received control data words of lower quality than subsequently received data words having the same sequence number.

In one aspect of the invention, a method is provided for delivering and storing interactive device control data using the horizontal overscan portion of a video signal. The video signal is received during a transmission session, such as a television program or a video taped program. Control data is extracted from the horizontal overscan portion of the video signal. After the transmission session has ended, the interactive device performs behavior defined by the control data.

In another aspect of the invention, a system is provided for delivering and storing interactive device control data using the horizontal overscan portion of a video signal. A decoder extracts control data from a horizontal overscan portion of a video signal during a transmission session, such as a television program or a video taped program. The interactive device performs the behavior defined by the control data. The interactive device has a non-volatile memory for storing the control data during the transmission session for use by the interactive device after the transmission session. The interactive device also has a controller for retrieving the control data from the non-volatile memory and for causing the interactive device to perform the behavior defined by the control data.

In yet another aspect of the invention a method is provided for delivering and storing interactive device control data via a video signal. The video signal is received during a transmission session and control data is extracted from the video signal. Behavior defined by the control data is performed during the transmission session and control data is stored in a non-volatile memory in response to the receipt of a storage instruction within the extracted control data. After the transmission session ends, the behavior defined by the control data is performed.

In an alternative embodiment, the encoded video signal can also be passed along to the receiving interactive device without decoding. The interactive device can store the received video signal data and then can transmit the stored data to yet another device, which can, in turn, either store or decode the data.

That the invention improves over the drawbacks of the prior art and accomplishes these advantages will become apparent from the following detailed description of the exemplary embodiments and the appended drawings and claims.

DETAILED DESCRIPTION

Figure 1:
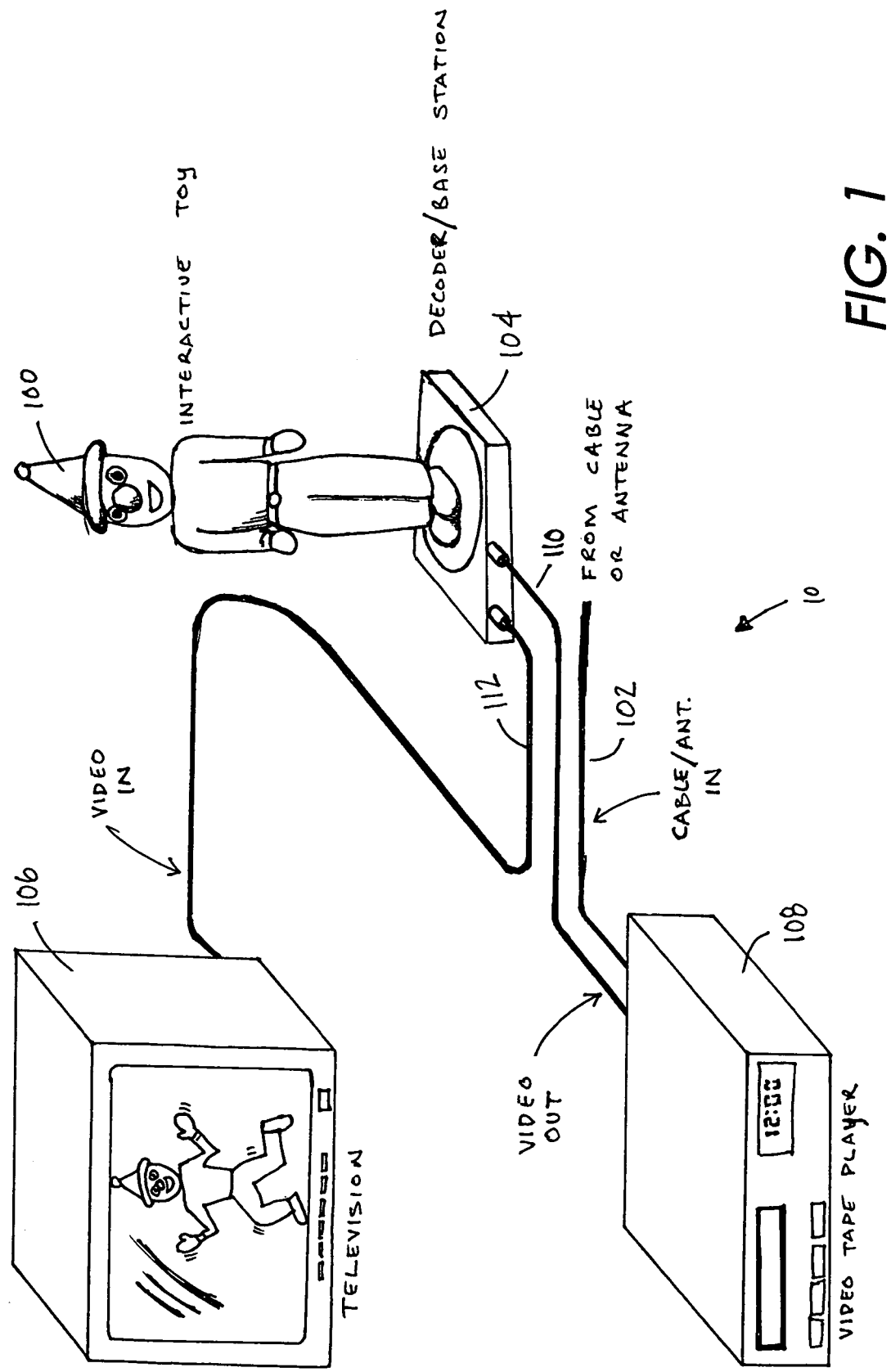
FIG. 1 is a block diagram of a control system for delivering control data to an interactive device via the horizontal overscan portion of a video signal.

An exemplary embodiment of the invention is a system and method for decoding and storing control data received via the horizontal overscan area of a video signal. A method and system for encoding control data into the horizontal overscan area of a video signal is provided in a co-pending U.S. patent application Ser. No. 08/885,385, which is a continuation-in-part of U.S. patent application Ser. No. 08/795,710. Both of these applications are assigned to the Assignee of the present application, Microsoft Corporation, and both applications are hereby incorporated by reference. For the purposes of the following discussion, it is assumed that control data (also called behavior data) has been encoded into the horizontal overscan portion of a video signal.

The present invention may be deployed in a wireless or hard-wired communication environment that includes an interactive device, such as an interactive toy, and a decoder that extracts control data from a video signal and provides it to the interactive device. The interactive device may include a controller and several electromechanical output devices, such as servo-motors, voice synthesizer, and visual devices, such as light bulbs or LEDs. The controller receives control data from the decoder and controls the output devices in accordance with the control data received from the decoder. The controller also can store the received control data in a memory that is also part of the interactive device.

Control data can be transmitted from the decoder to the controller by many well-known means of data transmission. In an exemplary embodiment, the decoder has an infrared transmitter and the interactive device has an infrared receiver. The control data can be transmitted from the transmitter to the receiver in discrete data words over a short distance. Preferably, the decoder has a surface (or base station) upon which the interactive device can be placed to minimize the distance between the transmitter and the receiver.

Control data that is encoded into the video signal may include noise or other erroneous data. In an exemplary embodiment, the controller can store received control data in association with a sequence code. During a particular transmission period (e.g., during a television program), the controller may receive repeated transmissions of the same control data word. Identical control data words have the same sequence number. The controller may replace a previously stored data word with a more recently received data word if the more recent data word has fewer errors in the control data contained therein. A well known grading procedure can be used to determine the quality grade (i.e., number of errors) of a particular data word. When each data word is stored in memory, the grade associated with the word can also be stored in memory. By comparing the quality grade of a stored data word with that of a recently received data word, the controller can replace lower quality data words with higher quality data words.

An Exemplary Interactive Device Control System

Referring now to the drawings, in which like numerals represent like elements throughout the several figures, aspects of the present invention and exemplary operating environments will be described.

FIG. 1 illustrates an exemplary environment for embodiments of the present invention. The depicted environment may be operated as a learning and entertainment system for a child. The environment includes a control system 10 that provides control data to an interactive device, such as interactive toy 100. An exemplary control system 10 includes a video signal source 102, a decoder/base station 104, and a display device, such as television 106. The control system 10 transmits control data to the interactive toy 100 via decoder 104. To accomplish this task, the decoder 104 interfaces with the audio/video signal source 102 and the television 106 through a standard video interface. Over this standard video interface, the decoder 104 receives a video signal encoded with control data (encoded video) from the video signal source 102. The decoder 104 extracts the control data from the encoded video signal, and then transfers the control data to the interactive toy 100.

The control system may also have a video tape player 108. The video tape player 108 can also provide control data that is stored on a video tape played by the video tape player. The video tape player 108 can transmit an encoded video signal to the decoder 104 over a video out line 110 that can be directly connected to the decoder. When the control system is configured with a video tape player 108, as depicted, control data may be provided from either the video signal source 102 or the video tape player 108. This is advantageous, because it is desirable to provide control data both through televised programs (via the video signal source 102) and through taped programs (via the video tape player 108). When control data is provided via the video signal source 102, the encoded video signal will simply pass through the video tape player 108.

In either case, the video signal will be passed through the decoder 104 to the television 106, which will present the encoded video signal in the conventional manner. Thus, a user can observe the video presentation on the television 106 while the decoder 104 transmits control data to the interactive toy 100. The reception of the control data may cause the interactive toy 100 to move and talk as though it is a character in the video program presented on the television 106.

There is no need to modify the encoded video signal before passing it to the television 106. Typically, the decoder 104 receives the encoded video signal, which is a standard video signal that has been modified to include digital information in the horizontal overscan intervals of the scan lines, which are not displayed on the television 106. Thus, the television 106 can receive and display the encoded video signal without modification. The decoder 104 only needs to extract the control data from the encoded video signal and transmit the control data to the interactive toy 100.

In an alternative embodiment, the encoded signal may be delivered by another data transmission means, such as via a computer (not shown). In this embodiment, the decoder 104 could receive encoded data from the computer during a transmission session and could extract the control data. The decoder 104 could then pass the control data along to the interactive toy 100 which could store the control data and perform the behavior defined by the control data during or after the transmission session. A transmission session may be, for example, the period during which a particular computer application is executing.

An Exemplary Interactive Device

Figure 2:
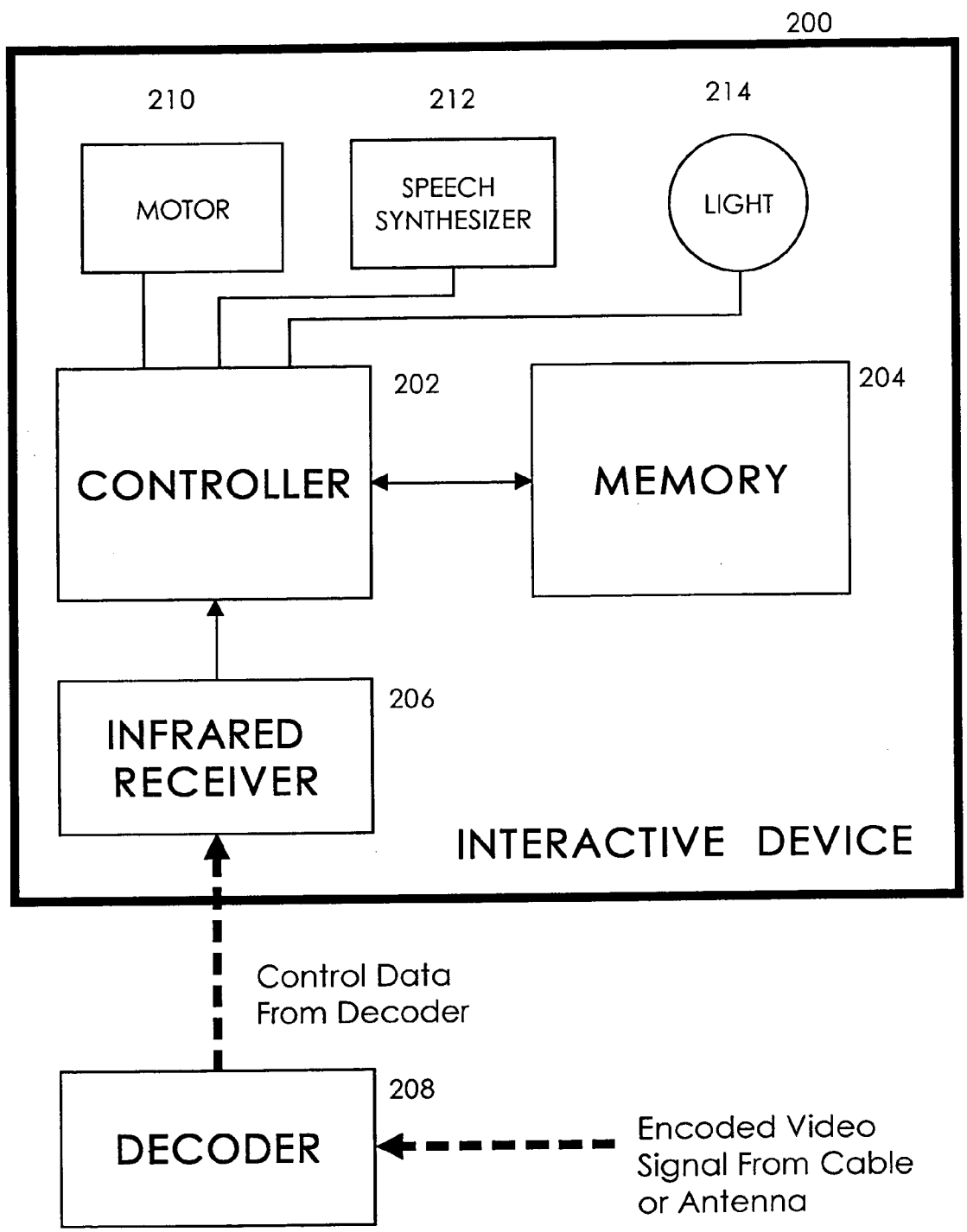
FIG. 2 is a block diagram illustrating the primary functional components of an exemplary interactive device.

FIG. 2 is a block diagram illustrating the primary functional components of an exemplary interactive device 200. As described in connection with FIG. 1, the interactive device 200 receives control data in the form of a series of data words from the decoder 208 by way of infrared receiver 206. The infrared receiver 206 then passes the control data to the controller 202. The controller 202 can store the control data in memory 204 or can cause the interactive device 200 to perform the behavior defined by the control data by controlling electromechanical devices 210–214. Alternatively, the controller 202 can retrieve control data from memory 204 and cause the interactive device 200 to perform the behavior defined by the control data. In another alternative embodiment, the controller 202 can cause the interactive device 200 to perform the behavior defined by the control data in real-time (i.e., as it is being received), without storing the control data in the memory 204.

In an alternative embodiment, the decoder 208 could transmit control data by a means other than the described infrared signal. For example, the control data could be transmitted by a radio frequency (RF) signal, whereby the decoder 208 and the interactive device 200 could be separated by a significant distance during transmission of control data. In another alternative embodiment, the decoder may be implemented as an integral part of the interactive device 200. In yet another alternative embodiment, the encoded video signal can also be passed along to the receiving interactive device without decoding. The interactive device of this embodiment can store the received video signal data and then can transmit the stored data to yet another device, which can, in turn, either store or decode the data.

It will be appreciated that the electromechanical devices 210–214 are merely examples of devices that could be incorporated into an interactive device. In response to received control data, the controller 202 may run a motor 210 to cause an interactive toy's limb to move. Alternatively, the controller 202 may provide speech data to drive a speech synthesizer to produce audio output through a speaker (not shown) or may turn on a light 214 or other visual display device. These devices are preferably controlled to coordinate the behavior of the interactive device 200 with a televised program or to teach the interactive device behavior that can be performed subsequent to the televised program. The period during which control data is received by the interactive device 200 (whether via a broadcast or via video tape play-back) is referred to as the transmission session.

Importantly, an exemplary embodiment of the interactive device 200 is equipped with a non-volatile memory 204. The memory 204 permits the storage of control data that can control the behavior of the interactive device 200 even after the encoded video signal stops providing control data. Generally, this means that the behavior of the interactive device 200 persists despite the termination of control data flow into the infrared receiver 206. More practically, this means that an interactive device can be programmed to exhibit behavior that is "learned" during the transmission session of an encoded video signal, long after the transmission session has ended. Accordingly, in an exemplary embodiment of the interactive device 200, the device could perform behavior defined by the control data during and/or after the transmission session.

It will be appreciated by those skilled in the art that the interactive device 200 can be an interactive toy, but could also be implemented as any other device that is capable of receiving and processing control data. An example of another interactive device is an electronic coupon which is described and claimed in a co-pending application filed on Dec. 30, 1999 with U.S. patent application Ser. No. 09/476,291 assigned to Microsoft Corporation. This co-pending application is hereby incorporated by reference.

An Exemplary Control Data Word

Figure 3:
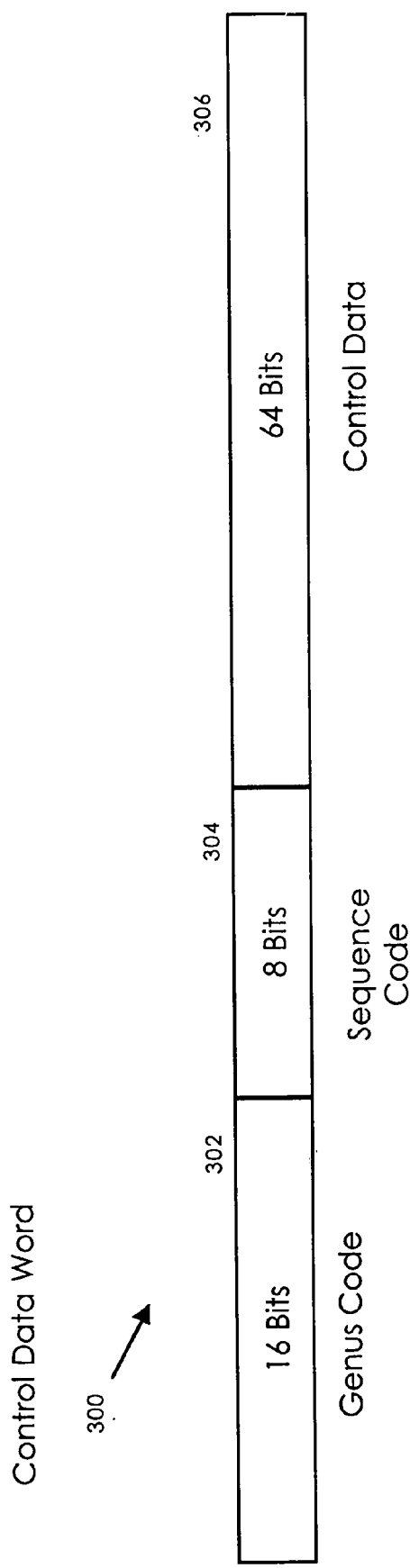
FIG. 3 is a block diagram depicting the primary components of an exemplary control data word.

FIG. 3 is a block diagram that illustrates the primary components of an exemplary control data word 300. Data word 300 includes three main components, a genus code 302, a sequence code 304, and control data 306. In an exemplary embodiment, the genus code is 16 bits in length, the sequence code is 8 bits in length, and the control data is 64 bits in length.

The genus code 302 is used to identify the interactive device to which the control data 306 is directed. The genus code 302 enables the control system 10 (FIG. 1) to avert a situation in which an interactive device receives and performs behavior that was intended for another interactive device. Additionally, use of the genus code 302 permits the receipt of control data by more than one interactive device during the same transmission session, without delivering control data to the wrong interactive device. For example, a video program may involve more than one character, each represented by a separate interactive toy. A user can teach each interactive toy new and separate behavior during the same video program, because each interactive toy will receive only the control data with the proper genus code and will ignore the control data with a different genus code. Genus code filtering can be done by the decoder 208 (FIG. 2) or by the controller 202 (FIG. 2) of the interactive device 200 (FIG. 2).

The sequence code 304 is used to identify control codes delivered to the interactive device during a transmission session. Each unique control code word that is delivered during a transmission session has a unique sequence code 304. The sequence code is useful primarily for two reasons. First, the control data can be ordered in memory, based on the sequence code of the control data word. When the interactive device performs the behavior defined by the control codes in memory, the codes can be performed in order. Thus, the performed behavior can be serialized, such that each stored control word is performed in a particular order. Of course, the controller can also cause the control data to be performed in random order.

Second, the sequence code enables the minimization of the effects of data errors. Because video signal deterioration can cause the introduction of data errors into the control data 306 during transmission, a method for reducing the effects of such errors is provided in an exemplary embodiment of the present invention. When the controller receives a control data word 306, the controller analyzes the control data to identify errors. This analysis can be any one of a number of well known means for identifying errors in transmitted data. For example, the control data might include a checksum in a predefined location that can be compared against the received control data to determine whether the control data contains an error. The controller can then assign the control data word 300 an error grade, that reflects the number or significance of errors identified in the control data 306. The error grade can be stored in memory in association with the control data word 300.

The quality of the stored control data words can be maximized by repeating the transmission of control data words having the same sequence number. When the controller receives a control data word 300 having a new sequence number, then the controller simply saves the data word in memory. When the controller receives a data word having a sequence number matching another data word that is already stored in memory, then the controller may replace the previously stored data word with the newly received data word. To make this determination, the controller generates an error grade for the newly received data word and compares the error grade to the error grade that has been stored in association with the previously stored data word. If the error grade for the newly received data word is greater (i.e., fewer or less significant errors in the control data) than that of the previously stored data word, then the controller will replace the previously stored data word with the newly received data word in memory. The error grade for the newly received data word will be stored in association with the newly received data word in memory.

The control data 306 component of the control data word 300 can include various kinds of data and can be any length suitable for the intended interactive device. Most importantly, it contains the control data that defines the behavior to be performed by the interactive device. However, it can also contain other data, such as the checksum value described above. In an alternative embodiment, the control data 306 component also can include an instruction as to whether the data word should be stored in memory or not stored in memory. In another alternative embodiment, the control data 306 component also can include an instruction as to whether the behavior defined by the control data in the data word should be performed in real-time (i.e., during the transmission session). Those skilled in the art will appreciate that the control data word can be formatted in various ways to provide control data to an interactive device.

An Exemplary Method for Processing Control Data

Figure 4:
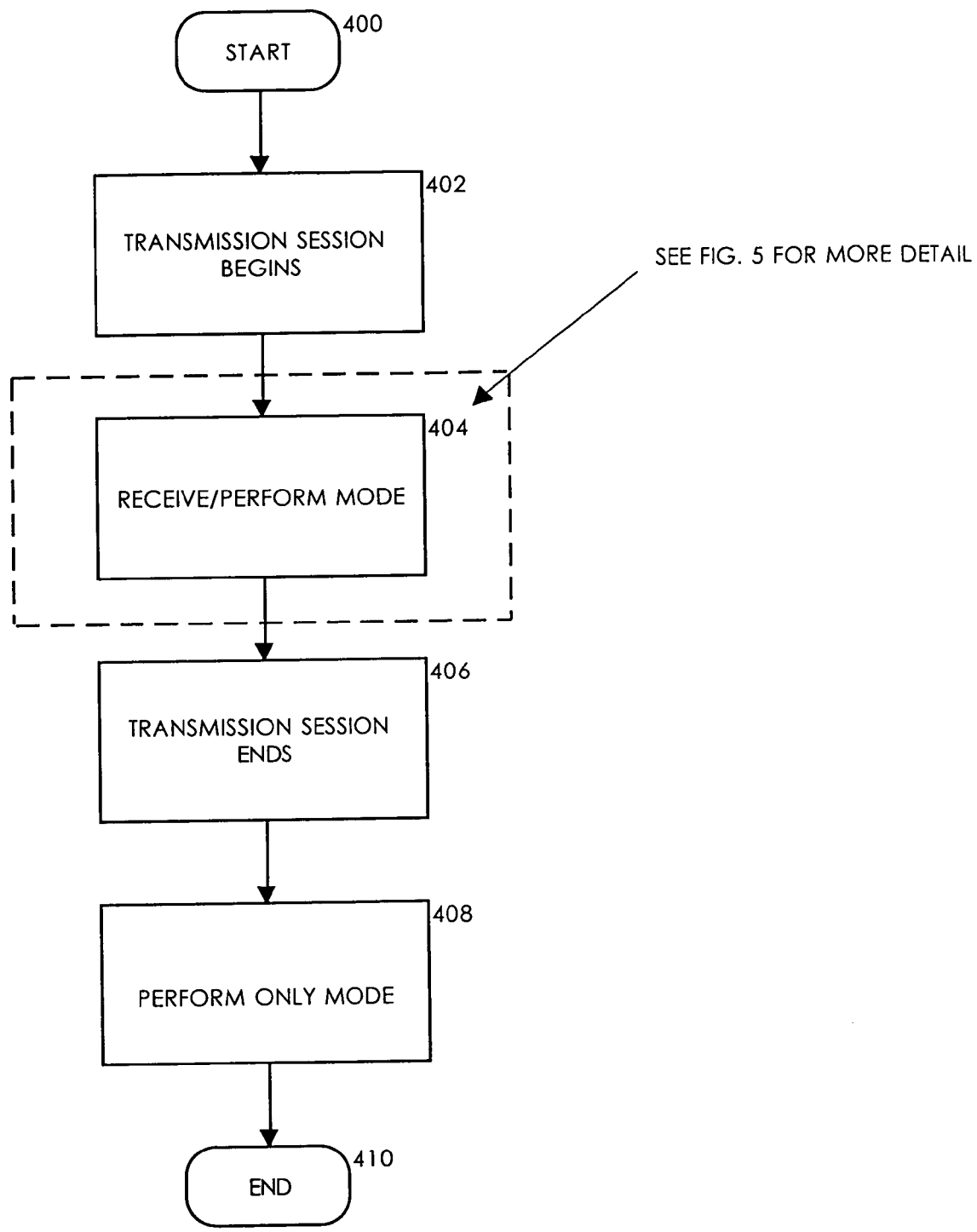
FIG. 4 is a flow chart that illustrates an exemplary method for processing control data words during and after a transmission session.

FIG. 4 is a flow chart that illustrates an exemplary method for processing control data words during and after a transmission session. The method starts at step 400 and proceeds to step 402, wherein the transmission session begins. Normally, this will happen when a television show is broadcast or a video tape is played-back that includes control data encoded within the video signal. The method proceeds to step 404, in which the interactive device enters a receive/perform mode. In this mode, an exemplary interactive device is enabled to receive and store control data. In an alternative embodiment, the interactive device is enabled to perform the behavior defined by the control data in real-time. The method then proceeds to step 406 wherein the transmission session ends. Typically, this will occur when the television program or video tape program is over or when the transmission of control data is terminated. The method then proceeds to step 408, wherein the interactive device switches to perform-only mode. In perform only mode, the interactive device is no longer receiving control data, but simply performs the behavior defined by the control data stored in the interactive device's memory.

It should be appreciated that the interactive device can be switched between Receive/Perform mode and Perform-only mode in various ways. In an exemplary embodiment, the interactive device could be equipped with a switch that the user can operate to select between these modes. Alternatively, the interactive device may be programmed to automatically select an appropriate mode. For example, if the interactive device is powered-up and does not detect a control data transmission at its infrared receiver, then the interactive device may automatically select Perform-only mode. If, on the other hand, the interactive device detects the transmission of control data, then the interactive device may automatically select Receive/Perform mode.

A more detailed description of step 404, the Receive/Perform mode, is provided below in connection with FIG. 5.

An Exemplary Method for Storing Control Data

Figure 5:
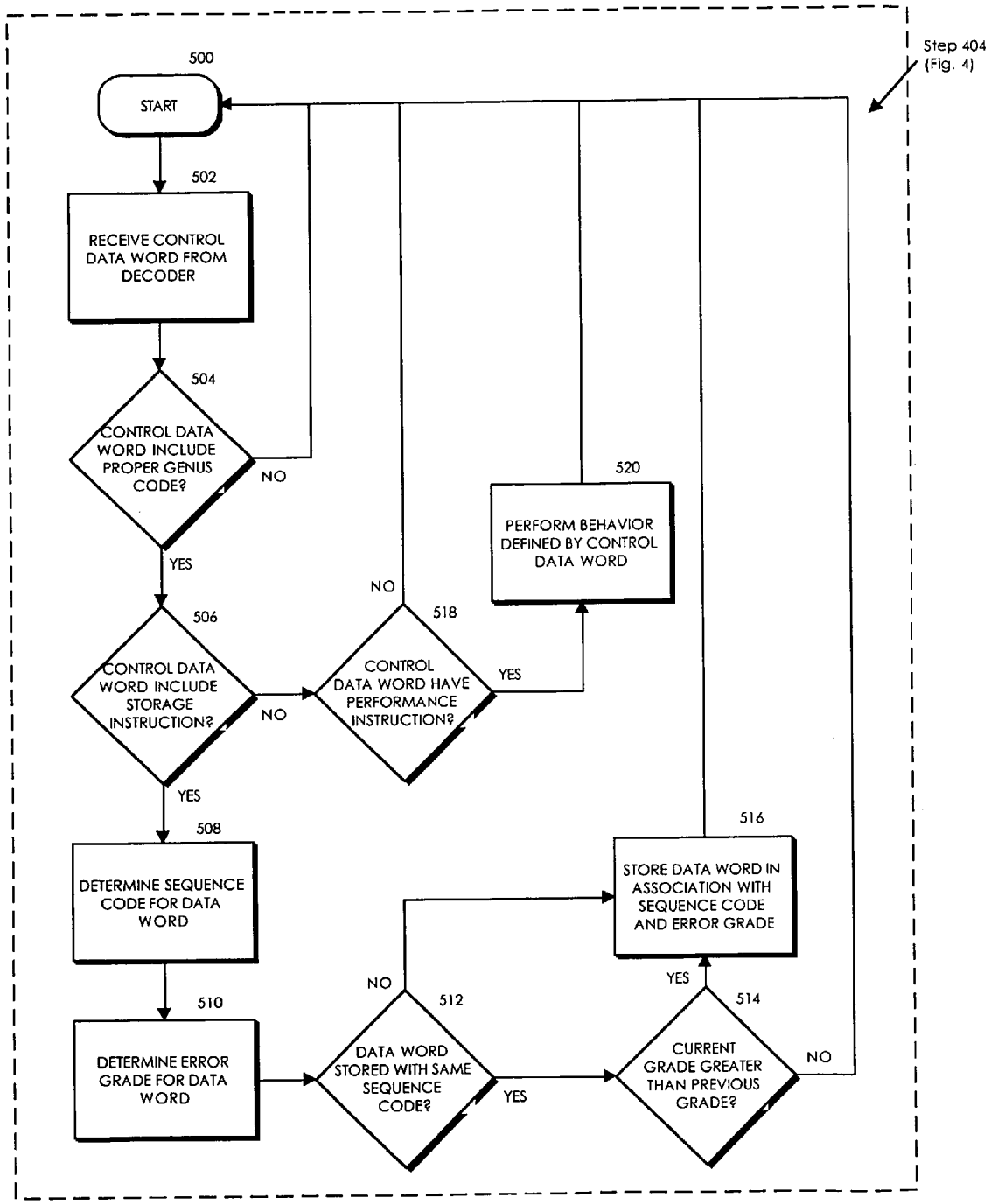
FIG. 5 is a flow chart that illustrates an exemplary method for storing control data words that are extracted from an encoded video signal and for performing behavior defined therein.

FIG. 5 is a flow chart that illustrates an exemplary method for storing control data words that are extracted from an encoded video signal. The method starts at step 500 and proceeds to step 502 in which a control data word is received from the decoder. The method then proceeds to step 504 and a determination is made as to whether the control data word includes a genus code corresponding to the interactive device. If the genus code does not match that of the interactive device, then the genus code is meant for another interactive device, and the method branches back to step 500. Alternatively, if the genus code matches that of the interactive device, then the method branches along the "Yes" path to decision block 506. At decision block 506, a determination is made as to whether the data word includes a storage instruction. If the data word does not include a storage instruction, then the method branches to decision block 518. On the other hand, if the data word includes a storage instruction, then the method branches to step 508.

At step 508, the sequence code for the received data word is determined. The method then proceeds to step 510 and the quality grade is determined for the data word. Those skilled in the art will appreciate that various well known methods exist for determining and grading the quality of data that has been transmitted. Once a quality grade has been determined for the data word, the method branches to decision block 512 and a determination is made as to whether a data word with the same sequence code has been previously stored in memory. If one has not been, then the method branches to step 516 and the data word is stored in memory with its sequence code and its quality grade. On the other hand, if a data word with the same sequence code has been previously stored in memory the method branches to decision block 514, wherein a determination is made as to whether the quality grade of the current data word is greater (i.e., better) than the quality grade of the previously stored data word. If not, then the method branches back to step 500. On the other hand, if the quality grade of the current data word is greater than the quality grade of the previously stored data word, then the current data word is stored in memory with its sequence code and its quality grade. Notably, the current data word will replace the previously received data word, having the same sequence number. Once the data word is stored in memory in step 516, then the method proceeds to step 500.

Returning now to decision block 506, if the received data word does not include a storage instruction, then the method branches to decision block 518. At decision block 518, a determination is made as to whether the received data word includes a performance instruction. If it does, then the method branches to step 520 and the interactive device performs the behavior defined by the received control data word.

The invention thus provides a method and system for decoding and storing encoded control data delivered via the horizontal overscan area of a video signal. An interactive device such as an interactive toy performs behavior defined by control data that can be encoded into a video signal that can be broadcast or played-back from video tape. The interactive device is equipped with a non-volatile memory that permits the control data to be stored for performance subsequent to the transmission session (e.g., a televised program). The interactive device also may be equipped to perform behavior during the transmission session. The control data is delivered as a series of control data words that include genus codes and sequence codes. Genus codes identify the interactive device to which the data word is directed, so that a particular interactive device will respond (i.e., perform behavior) only in accordance with the control data words including the appropriate genus code. Because video transmissions are subject to video signal deterioration, error grading is used to minimize the effect of such signal deterioration. During a given control data transmission session, control data words will be repeated, so that an interactive device receives several control data words with the same sequence number. Based on the relative gradings, the interactive device will replace previously received control data words of lower quality than subsequently received data words having the same sequence number.

It should be understood that the foregoing relates only to specific embodiments of the invention, and that numerous changes may be made therein without departing from the spirit and scope of the invention as defined by the following claims.

What is claimed is:

1. A method for delivering and storing control data for an interactive device using a horizontal overscan portion of a video signal, the method comprising the steps of:
   receiving the video signal during a transmission session, the transmission session comprising a plurality of frames, wherein the plurality of frames defines a program that is displayed to a viewer during the transmission session;
   extracting control words from the horizontal overscan portion of the video signal, each control word comprising a plurality of data bits, the plurality of data bits defining a sequence code and the control data, the sequence code facilitating error grading, each control word that includes the same control data also having the same sequence code;
   where for each control word, the method further comprises the steps of:
   using the sequence code to determine an error grade for the control word; and
      determining if the control word is already stored in the interactive device; and if not,
         storing the control word in the interactive device; else
         storing the control word having a higher quality as indicated by the error grade in the interactive device, and discarding the control word having a lower quality as indicated by the error grade; and
   following the transmission session, when the program is no longer being displayed to the viewer, performing a behavior defined by the control data of each control word stored in the interactive device.

2. The method of claim 1, wherein the control data in each control word comprise sixty-four bits.

3. The method of claim 1, wherein the sequence code in each control word comprises eight bits.

4. The method of claim 1, further comprising the step of performing behavior defined by the control data during the program.

5. The method of claim 1, wherein the control data comprises a first type of control data corresponding to control data that is to be used by an interactive device during the transmission session while the program is being displayed to the viewer, and a second type of control data corresponding to control data that is to be used by the interactive device after the transmission session, when the program is no longer being displayed to the viewer, and further comprising the step of storing the second type of control data in a non-volatile memory contained within the interactive device.

6. The method of claim 5, wherein the step of storing the second type of control data is performed in response to the receipt of a storage instruction within the extracted control data.

7. The method of claim 5, further comprising the step of retrieving the second type of control data from the memory contained within the interactive device prior to performing the behavior defined thereby.

8. The method of claim 1, wherein the step of performing the behavior defined by the control data of each control word stored in the interactive device comprises the step of analyzing the sequence code of each control word stored in the interactive device to determine an order with which the behavior defined by the control data of each control word stored in the interactive device is to be performed.

9. The method of claim 1, wherein the video signal includes control data for a plurality of different interactive devices, and the plurality of data bits further defines a genus code, the genus code indicating a specific one of the plurality of different interactive devices for which the control data are intended, and for each control word, the method further comprises the steps of:
using the genus code to determine for which one of the plurality of different interactive devices the control word is intended;
transmitting the control word only to the one of the plurality of interactive devices for which it is intended, such that after the transmission session, the behavior defined by the control data of the control word is performed only by the one of the plurality of interactive devices.

10. The method of claim 1, wherein the video signal includes control data for a plurality of different interactive devices, and the plurality of data bits further defines a genus code, the genus code indicating one of the plurality of different interactive devices for which the control data are intended, and for each control word, the method further comprises the steps of:
transmitting the control word to each of the plurality of different interactive devices, so that each of the plurality of different interactive devices performs the following steps:
using the genus code of the control word to determine if the control word is intended for the interactive device that is carrying out this step; and
storing only control words corresponding to the interactive device for which the control word was intended, such that after the transmission session, the behavior defined by the control data of any control words stored is performed only by the interactive device that stored any such control words.

11. The method of claim 10, wherein each of the plurality of different interactive devices further performs the step of discarding each control word that is intended for a different one of the plurality of different interactive devices.

12. The method of claim 10, wherein each of the plurality of different interactive devices further performs the step of transmitting each control word that is intended for a different one of the plurality of different interactive devices to another one of the plurality of different interactive devices.

13. The method of claim 4, wherein the behavior defined by the control data comprises storing the received control data in a non-volatile memory contained within the interactive device for subsequent transmission to another device.

14. A system for delivering and storing control data for an interactive device using a horizontal overscan portion of a video signal, the system comprising:
a decoder operative to extract control words from a horizontal overscan portion of a video signal during a transmission session, the transmission session comprising a plurality of frames, wherein the plurality of frames defines a program that is displayed to a viewer during the transmission session, each control word comprising a plurality of data bits, the plurality of data bits defining a sequence code and the control data for the interactive device, the sequence code facilitating error grading, each control word that includes the same control data also having the same sequence code;
a wireless transmitter operative to transmit control words that are extracted to the interactive device; and
the interactive device being operative to perform a behavior defined by the control data for the interactive device, the interactive device comprising:
a non-volatile memory operative to store control words received during the transmission session for use by the interactive device after the transmission session has ended and the program is no longer displayed to the viewer, and
a controller operative to:
analyze each control word received to determine an error grade corresponding to that control word;
determine if a control word having the same sequence code has already been received and stored in the non-volatile memory, and if not, then storing the control word in the non-volatile memory, else, determining which of the control words having the same sequence code is of a higher quality, by comparing the error grades of the control words having the same sequence code, such that the control word of the higher quality having the same sequence code is stored in the non-volatile memory, and the other control word having the same sequence code is discarded;
after the transmission session, retrieve each control word stored in the non-volatile memory and cause the interactive device to perform the behavior defined by the control data of each control word stored in the non-volatile memory.

15. The system of claim 14, wherein the decoder is integrated within the interactive device.

16. The system of claim 14, wherein the wireless transmitter is a radio frequency transmitter, and the interactive device includes a radio frequency receiver.

17. The system of claim 14, wherein the controller is further operative to analyze the sequence code of each control word stored in the non-volatile memory to determine an order in which the behavior defined by the control data of each control word stored in the non-volatile memory is to be performed.

18. The system of claim 14, wherein the wireless transmitter is an infrared transmitter, and the interactive device includes an infrared receiver.

19. The system of claim 14, further comprising at least one additional interactive device, wherein the plurality of data bits in each control word further defines a genus code, the controller of each interactive device being operative to analyze the genus code of each control word received, so that only control words having a genus code corresponding to a specific interactive device are stored in the non-volatile memory of the specific interactive device.

20. The system of claim 14, further comprising at least one additional interactive device, wherein the plurality of data bits in each control word further define a genus code, the decoder using the genus code of each control word to determine for which of the interactive devices the control word is intended, so that each control word is transmitted only to the interactive device thus identified by the genus code.

21. A method for delivering and storing control data for an interactive device via the horizontal overscan portion of a video signal, the method comprising the steps of:
receiving the video signal during a transmission session, the transmission session comprising a plurality of frames, wherein the plurality of frames defines a program that is displayed to a viewer during the transmission session;
extracting control words from the horizontal overscan portion of the video signal, each control word comprising a plurality of data bits, the plurality of data bits defining a genus code, a sequence code, and the control data for the interactive device, the genus code identifying a specific interactive device for which the interactive device control data is intended;

transmitting each control word that was extracted to the specific interactive device identified by the genus code, such that each interactive device receiving a control word executes the following steps:
  determining an error grade for the control word using the sequence code;
  determining if the control word is already stored in the interactive device; and if not,
    storing the control word in the interactive device;
  else
    storing a control word having less errors, as indicated by its error grade, in the interactive device and discarding a control word having more errors, as indicated by its error grade; and
following the transmission session while the program is no longer being displayed to the viewer, performing a behavior defined by the control data for the interactive device.

* * * * *